United States Patent [19]
Sittler et al.

[11] Patent Number: 5,502,380
[45] Date of Patent: Mar. 26, 1996

[54] ANALOG WEIGHTED BINARY ABSOLUTE POSITION ENCODER INCLUDING AN ARRAY OF SENSE RESISTORS EACH HAVING MATERIAL RESPONSIVE TO FWX AND NONRESPONSIVE TO FLUX

[75] Inventors: Fred C. Sittler, Victoria; Kathryn M. Howard, Chanhassen, both of Minn.

[73] Assignee: Rosemount Inc., Eden Prairie, Minn.

[21] Appl. No.: 234,182

[22] Filed: Apr. 28, 1994

[51] Int. Cl.$^6$ .............. G01B 7/14; G01R 33/06; H03M 1/22; G01D 5/34
[52] U.S. Cl. .............. 324/207.21; 324/252; 137/554; 341/15; 338/32 R; 250/231.13; 250/357.1
[58] Field of Search ............ 324/207.13, 207.2, 324/207.21, 207.22, 207.23, 207.24, 207.25, 251, 252; 250/231.13, 231.14, 231.15, 231.16, 231.17, 231.18, 357.1, 390.12, 370.1; 338/32 R, 32 H; 137/554; 341/15

[56] References Cited

U.S. PATENT DOCUMENTS

| | | | |
|---|---|---|---|
| 3,555,285 | 1/1971 | Irving | 250/220 |
| 4,039,936 | 8/1977 | Jones et al. | 324/34 |
| 4,236,074 | 11/1980 | Chen | 250/308 |
| 4,319,188 | 3/1982 | Ito et al. | 324/173 |
| 4,418,372 | 11/1983 | Hayashida et al. | 360/113 |
| 4,429,276 | 1/1984 | Narimatsu et al. | 324/207 |
| 4,631,519 | 12/1986 | Johnston | 340/347 P |

(List continued on next page.)

FOREIGN PATENT DOCUMENTS

| | | |
|---|---|---|
| 0093870 | 11/1993 | European Pat. Off. . |
| 254465A1 | 6/1987 | German Dem. Rep. . |
| 4208154A1 | 3/1991 | Germany . |
| 2205406 | 12/1988 | United Kingdom . |
| 2210222 | 1/1990 | United Kingdom . |

OTHER PUBLICATIONS

Encoder Products Company Catalog, "The Responsive People In Motion", 1992.
J. P. J. Groenland, "Magnetoresistive Transducer for Absolute Position Detection", *IEEE Transactions on Magnetics*, vol. MAG–20, No. 5, pp. 969–971, Sep. 1984.
D. Wobschall and M. Smolen, "A Patterned Capacitive Absolute Displacement Sensor", *SENSORS*, pp. 50–52, Aug. 1992.

Primary Examiner—Sandra L. O'Shea
Assistant Examiner—Roger Phillips
Attorney, Agent, or Firm—Westman, Champlin & Kelly

[57] ABSTRACT

A magnet mounted on a moving stem or rotary member of a valve generates magnetic flux over part of a stationary member of the valve which has an uniquely patterned set of magnetoresistive sense resistors and three reference resistors (the sensor) disposed thereon. The distance between two adjacent patterns can be equally spaced, or can be compressed for valves with non-linear characteristics in order to achieve increased resolution over a specific portion of the valve travel. Other embodiments can use a light source, beta radiation or neutron radiation as the source of flux, the pattern for each embodiment's sensor having some material responsive and some unresponsive to the flux. The sensor can provide feedback representative of position in a valve positioner, or functions as the position sensor in a position transmitter.

Reference resistors provide a first signal representative of the resistance of a sense resistor in the absence of the flux and a second signal representative of the additive resistance of a sense resistor which is caused by the flux. An A/D circuit connected to the sense resistors differences the sensed resistance of each sense resistor with the first signal to calculate a referenced additive resistance and then ratios the difference with the second signal, weights the ratio by an appropriate weighting function and sums the referenced additive resistance for each of the sense resistors to provide the position sensor output.

35 Claims, 3 Drawing Sheets

U.S. PATENT DOCUMENTS

| | | | |
|---|---|---|---|
| 4,633,224 | 12/1986 | Gipp et al. | 250/231.18 |
| 4,717,979 | 1/1988 | Washisu | 360/113 |
| 4,779,211 | 10/1988 | March | 250/231.18 |
| 4,785,241 | 11/1988 | Abiko et al. | 324/207.21 |
| 4,786,870 | 11/1988 | Kawamata et al. | 324/208 |
| 4,801,830 | 1/1989 | Ogino et al. | 310/68 B |
| 4,847,584 | 7/1989 | Pant | 338/32 R |
| 4,853,631 | 8/1989 | Carmen | 324/208 |
| 4,866,382 | 9/1989 | Carmen | 324/208 |
| 4,926,154 | 5/1990 | Heremans et al. | 338/32 R |
| 5,115,239 | 5/1992 | Ushiyama | 341/15 |

ANALOG WEIGHTED BINARY ABSOLUTE POSITION ENCODER INCLUDING AN ARRAY OF SENSE RESISTORS EACH HAVING MATERIAL RESPONSIVE TO FWX AND NONRESPONSIVE TO FLUX

BACKGROUND OF THE INVENTION

The present invention relates to encoders for sensing the position of a first member moving relative to a second member. More particularly, the present invention relates to a sensor providing an absolute position of the moving member.

A number of absolute position encoders have developed. These position encoders include optical encoders wherein a decoder track is moved between a source of light and a photo detector so that the position of the track relative to the photodetector can be determined. Other optical arrangements employ tracks from which a binary word can be read at a position along the track, with the word uniquely defining a position along the length of the track.

Magnetic sensor devices have also been employed to detect absolute position. The fixed member includes multiple channels of magnetic material arranged in a pattern such as a binary code or a Gray code. Magnetoresistive resistors, which increase their resistance in the presence of a magnetic field, are located on the moving member. The potential across the magnetoresistive resistors is representative of the absolute position of the moving member, since the encoded pattern of the magnet provides a unique amount of resistance change. The smallest distance which such as position encoder can resolve is limited to the smallest spacing between the codes. These same types of position encoders are also suspectible to installation errors. In particular, the fixed and the moving members must be parallel to each other over the travel of the moving member so that the magnetic field is consent. The requirement that the magnetic field be constant limits the interchangeability of the members, in that the position encoder provides improper output if the dimensions of a replacement part are different from the part that was replace. In other words, such position encoders must be re-aligned when either the members to which the source or the encoder is affixed is replaced.

Therefore, there is a need for an absolute position encoder which works without elaborate alignment procedures, promotes interchangeability of components during field repairs and has an improved resolution over existing encoders.

SUMMARY OF THE INVENTION

A position sensor senses the position of a first member, and includes a flux source disposed on the first member for generating a flux over a portion of a stationary second member. The second member has a patterned flux receiving sensor disposed thereon, with some of the material in the pattern having a flux responsive parameter and some of the material being non-responsive to the flux. In a preferred embodiment, a magnet serves as the source of flux and the receiving sensor uses appropriate non-responsive material such as doped polysilicon and a responsive material such as magnetoresistive NiFe or NiCo. A visible light flux source can use an appropriate non-responsive material like metal over a semiconductor surface and a responsive material being the semiconductor surface covered with a very thin film of silicon dioxide. A beta or neutron radiation flux source can use an appropriate non-responsive metal material like lead or other metals and a responsive material like a semiconductor surface or a neutron sensitive plastic, respectively. Reference resistors provide a first signal representative of the resistance of a sense resistor in the absence of the flux and a second signal representative of the additive resistance of a sense resistor which is caused by the flux. An A/D circuit connected to the sense resistors differences the sensed resistance of each sense resistor with the first signal to calculate a referenced additive resistance and then ratios the difference with the second signal, weights the ratio by an appropriate weighting function and sums the referenced additive resistance for each of the sense resistors to provide the position sensor output. The position sensor can be used in a valve positioner, where the position sensor provides position feedback representative of the valve position, or in a position transmitter, which transmits an output representative of the position of a moving member, such as a valve stem or rotary member.

A second embodiment of the position sensor provides an output representative of the position of the valve to a valve positioner which controls the position of a stem or rotary member of a control valve. The sensor has a binary pattern which is logarithmically compressed so as to provide increased resolution for the desired valve characteristic. The desired valve characteristic can be a valve with quick opening, equal percentage or some other characteristic especially tailored for the application.

DETAILED DESCRIPTION OF THE PREFERRED EMBODIMENTS

Figure 1:
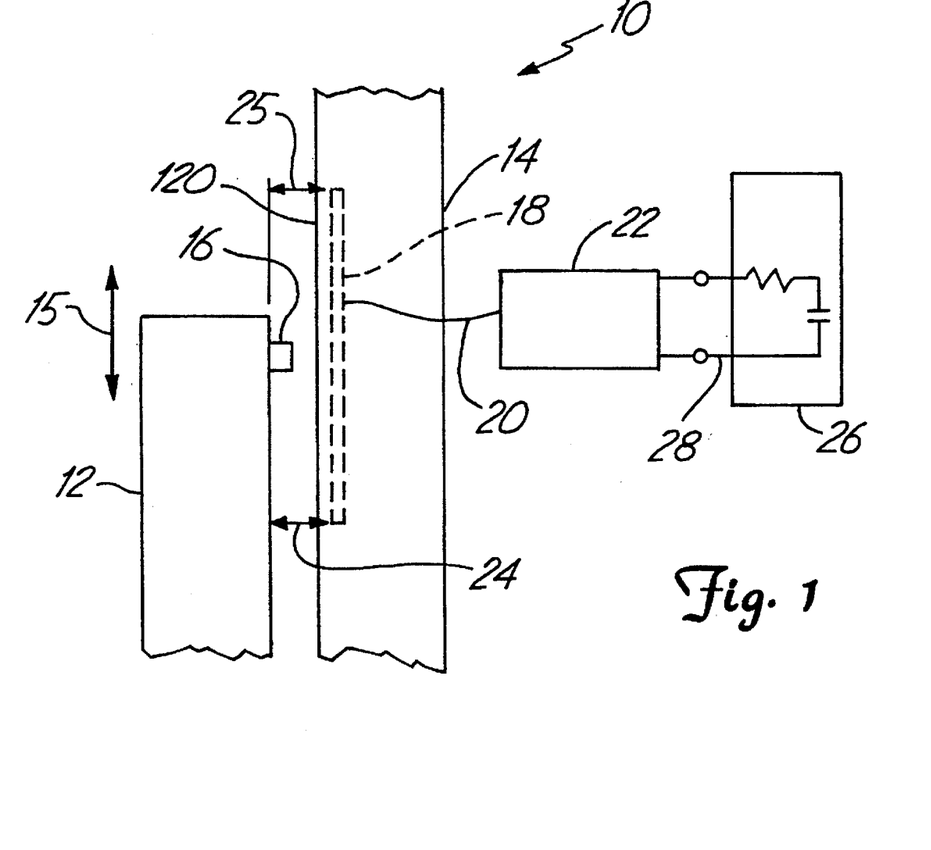
FIG. 1 is a side view of the position sensor of the present invention and its orientation to the moving member.

In FIG. 1, a member 12 moves relative to a stationary member 14, the movement as indicated by double arrow 15. A flux emitting source 16 is attached to moving member 12. A flux receiving sensor, illustrated with dashed lines at 18, is located on stationary member 14 and receives some of the flux emitted from source 16. Source 16 is spaced apart from sensor 18 a distance indicated by arrows 24 and 25. As described in detail below, sensor 18 comprises two types of materials, where one type of material is responsive to the flux and another type is unresponsive. Absolute position encoder 18 provides an analog output 20 representative of the absolute position of member 12 to an analyzer 22. Analyzer 22 digitizes analog output 20 and computes absolute position, which is coupled to a controller 26 over a current loop 28. Controller 26 provides the power for analyzer 22 and sensor 18. The absolute position encoder disclosed here can be used in any application where the absolute position of a moving member is required, such as in dampers for dryers and HVAC applications, but is especially useful in control valves where the flow through the valve must be critically monitored. In control valves, a small change in position of the valve stem or rotary member changes the flow through the valve significantly. When the present invention is used with a valve, output 20 represents the degree to which the valve is open, and so indirectly the amount of fluid flowing through the valve. Source 16 is mounted on the valve stem or rotary member and encoder 18 is affixed to a stationary member such as a pipe.

Figure 2:
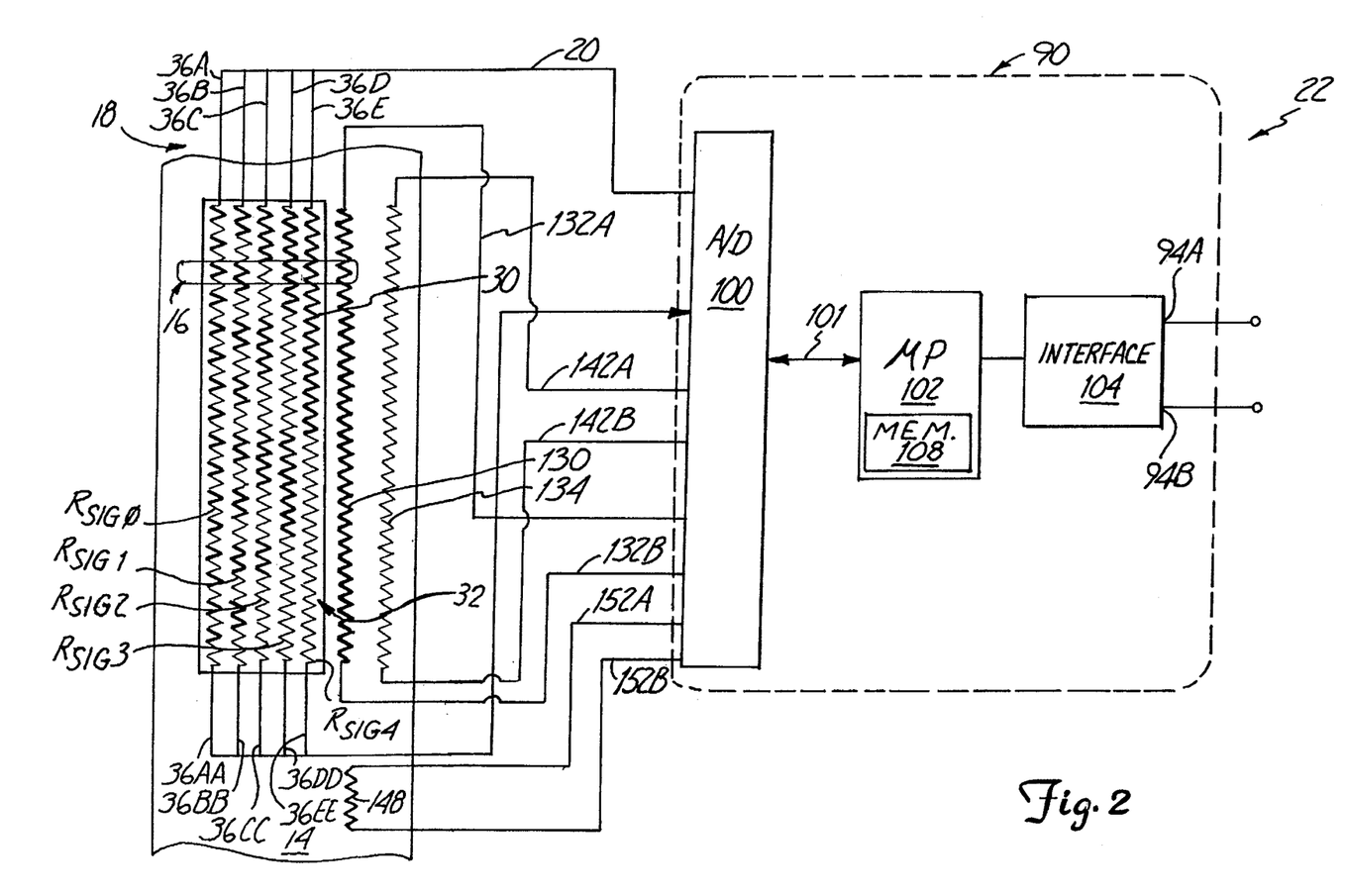
FIG. 2 is a schematic block diagram of the position sensor of the present invention, as used in a position transmitter.

In FIG. 2, transmitter 90 includes a set of patterned resistors $R_{SIG0}$–$R_{SIG4}$, three reference resistors 130, 134 and 148, an analog-to-digital (A/D) converter 100, a microprocessor 102 and an interface circuit 104. Resistors $R_{SIG0}$–$R_{SIG4}$ are included in flux receiving sensor 18 and are connected to A/D converter 100 through conductors 36A–36E, which form the equivalent of bus 20. Resistors $R_{SIG0}$–$R_{SIG4}$ are located so as to be subject to the flux from source 16. The thickened lines on each resistor represent the responsive material. For example, responsive material is indicated at 30 and non-responsive material is indicated at 32 on resistor $R_{SIG4}$. Taken as a whole, the patterning of the responsive/non-responsive materials on resistors $R_{SIG0}$–$R_{SIG4}$ represents a binary pattern where the least significant bit of the pattern is analogous to resistor 34A and the most significant bit of the pattern is analogous to resistor 34E. In other words, the frequency at which the responsive/non-responsive patterning repeats itself is halved for each of the resistors $R_{SIG0}$–$R_{SIG4}$. Each pattern represents a unique word representative of the position along the resistor strip. Other patterns, such as a Gray code pattern or the like may also be used.

In a first embodiment of the invention, the responsive material on circuits $R_{SIG0}$–$R_{SIG4}$ changes resistance in the presence of source 16, so that the potential across each circuit is measurably different when flux from source 16 affects the responsive material. The material is preferably magnetoresistive, and source 16 is a suitable magnet between 0.1 to 0.3 inches wide. The spacing between patterns on encoder 18 is significantly smaller than the width of source 16 and usually at least 10 times smaller than such width. The magnetoresistive material is a thin film (e.g. NiFe, NiCo) deposited on an insulating substrate, using standard thin film deposition and photolithography techniques. The non-responsive material is a conductor such as aluminum. The resistivity of both the non-magnetoresistive material and the magnetoresistive material is approximately 2000 ohms per square. However, the present invention is practical with other types of flux such as light or nuclear particle radiation, subject to the proviso that the flux field varies in intensity over the length of the sense resistors and that the extent of the field is greater than the spacing between the smallest adjacent spacing of the pattern on the sense resistors.

Three reference resistors are required: a reference resistor 130 ($R_{MON}$) composed substantially of responsive, magnetoresistive material and located in the flux, a reference resistor 134 ($R_F$) composed substantially of non-responsive material and a third reference resistor 148 ($R_{MOFF}$) composed substantially of responsive material but placed so that the flux doesn't affect its resistance. The resistances of $R_{MON}$ and $R_F$ are selected to be the approximately the same number of squares as resistors $R_{SIG0}$–$R_{SIG4}$, so as to minimize the temperature coefficient effects. In this particular embodiment of the invention, $R_{MOFF}$ is minimized in size to one square to conserve space. All the resistors are potted inside of a rugged sensing head for mounting to stationary member 14, such as a pipe. Both terminals of all three reference resistors 130, 134 and 148 are connected to A/D converter 100, which has A/D channels for potential and for current. The channels for converting potentials are charge distribution converters disclosed in U.S. Pat. Nos. 4,878,012, 5,093,091, 5,119,033 or 5,155,445, which convert a potential input to a digitized output but consume a minimal amount of operating power. The current channels in converter 100 are standard integrators, utilizing an op-amp and a capacitor connected across the input and output of the op-amp. Converter 100 receives two input potentials from each of resistors $R_{SIG0}$–$R_{SIG4}$, 130, 134 and 148, and outputs a digitized potential output for each input to a microprocessor 102 over a bidirectional SPI interface bus 101. Micro 102 has an integral memory 108 for storing instructions and is preferably made of CMOS to conserve operating power. Interface 104 receives the desired position signal over a two wire circuit formed by conductors 94A, 94B to controller 26. A typical output signal from the transmitter 90 is a 4–20 milliamp (mA) current signal, where the magnitude of the current represents the absolute position of moving member 12. Other communication protocols, such as digital signals superimposed on the analog current, or optical signal transmissions may also be used.

Microprocessor 102 receives two digitized potentials and a digitized current for each of the resistors and calculates a resistance for each, according to the equations in Table 1 below.

$$R_{SIG0} = (P_{36A} - P_{36AA}) \div I_{RSIG0}$$

$$R_{SIG1} = (P_{36B} - P_{36BB}) \div I_{RSIG1}$$

$$R_{SIG2} = (P_{36C} - P_{36CC}) \div I_{RSIG2}$$

$$R_{SIG3} = (P_{36D} - P_{36DD}) \div I_{RSIG3}$$

$$R_{SIG4} = (P_{36E} - P_{36EE}) \div I_{RSIG4}$$

$$R_{MON} = (P_{132A} - P_{132B}) \div I_{130}$$

$$R_F = (P_{142A} - P_{142B}) \div I_{134}$$

$$R_{MOFF} = (P_{152A} - P_{152B}) \div I_{148}$$

TABLE 1 where P denotes a digitized potential corresponding to the conductor referenced by the subscript, I denotes the current through the resistor corresponding to the subscript and $R_{SIGi}$ is the sensed and digitized resistance for each of the resistors $R_{SIG0}$–$R_{SIG4}$, respectively. With these calculated resistances, micro 102 calculates the following constants:

$$A = \frac{R_F}{2} + 16 R_{MOFF} \tag{1}$$

where A represents the amount of additive resistance of any of the resistors $R_{SIG0}$–$R_{SIG4}$ in the absence of flux. Each of the resistors $R_{SIG0}$–$R_{SIG4}$ have one half of their resistance contributed by magnetoresistive material and the other one-half contributed by non-magnetoresistive material. In similar fashion, the quantity $R_F/2$ in Equation 1 corresponds to the amount of resistance contributed by the non-magnetoresistive material and the quantity $16 R_{MOFF}$ corresponds to the amount of resistance contributed by the magnetoresistive material. The multiplier of 16 for the resistance $R_{MOFF}$ is present because the size of $R_{MOFF}$ is 1/32 of the size of the other resistors, and because only one-half of each of the resistors $R_{SIG0}$–$R_{SIG4}$ is magnetoresistive. Should the resistors be re-sized, the constants multiplying $R_F$ and $R_{MOFF}$ change appropriately, but should represent the amount of resistance contributed by the magnetoresistive material and the amount of resistance contributed by the non-responsive material. The other constant is given by:

$$B = R_{MON} - 32 R_{MOFF} \tag{2}$$

where the constant B represents the additive resistance caused by the flux, if the sensing resistor were entirely made of magnetoresistive material. The final step performed in micro 102 is to calculate the absolute position given by:

$$POS = \sum_{i=0}^{4} \frac{R_{sigi} - A}{B} \times 2^i \qquad (3)$$

where POS represents the absolute position of moving member 14. The numerator of Equation 3 is the difference between the sensed resistance $R_{SIGi}$ and the resistance of the resistor in the absence of flux, ratioed to the amount of additive magnetoresistive resistance caused by the flux, weighted by the bit weight for each of the resistors and summed over each of the resistors $R_{SIG0}$–$R_{SIG4}$.

Using this method, encoder 18 determines the position of the centroid of the magnetic field produced by source 16. For example, if the profile of the magnetic field is a gaussian or another symmetrical distribution, then output POS will indicate where the position of maximum magnetic field magnitude on the resistor strip. However, if the profile of the magnetic field is a non-symmetrical distribution, such as a skewed gaussian distribution, then the output POS will indicate the position where one-half of the integral of the magnetic field is on one side of POS and the remainder on the other side of POS. In other words, output POS indicates the centroid of the distribution.

However, the output POS does not take on a discrete set of values as a digital absolute position encoder would have. Rather, it takes on an infinite number of values between any adjacent encoded patterns in resistors $R_{SIG0}$–$R_{SIG4}$, and is therefore an analog output having infinite resolution. This effect comes about because the flux takes on a spread of magnitudes which affect the magnetoresistively patterned resistors. If the flux provided by source 16 had a step function profile so that only that magnetoresistive element directly under source were affected, then the output POS would be digital. But as the flux profile has a smoothly varying intensity, such as a gaussian profile, more of the magnetoresistively patterned resistor than just the area directly underneath source 16 is affected. To show the analog nature of the present invention, consider the value of output POS when source 16 is directly over the center of the magnetoresistive material on resistor $R_{SIG4}$. The amount of resistance contributed by $R_{SIG4}$ is as large as possible, since all of the resistor area on $R_{SIG4}$ which is affected by the flux is magnetoresistive, and because constants A and B are fixed constants and used for all resistors $R_{SIG0}$–$R_{SIG4}$. Now consider another case: where source 16 is directly over the non-magnetoresistive material on $R_{SIG4}$. Then the amount of resistance contributed to POS by $R_{SIG4}$ is substantially zero, since the value for $R_{SIG4}$ is substantially equivalent to the quantity A, which represents the amount of additive resistance for any one resistor in the absence of flux. Therefore, the additive resistance predicted by Equation 3 is substantially zero. These two cases respectively represent the maximum and the minimum amount of additive resistance which each resistor would contribute. However, when source 16 moves over the interface between the magnetoresistive and the non-magnetoresistive material on resistor $R_{SIG4}$, the additive resistance varies between the maximum and the minimum resistance discussed above, providing an analog weighted binary output for position encoder 18. In the present invention, the width of field is greater than the resolution of the measurement, whereas in the prior art, resolution is limited to the spacing between adjacent patterns. Because the present invention ratios the additive resistance cause by the flux to a fixed amount of resistance and because both quantities are affected by the same source, encoder 18 does not require re-calibration each time moving member 12 is replaced and works from a "cold start". In past encoders, re-calibration of the initial starting point and the ending point (zero and span) was necessary when any part of the encoder was replaced. The present encoder also is insensitive to variations in the distance between source 16 and the resistors $R_{SIG0}$–$R_{SIG4}$ at the top of the resistor strip as compared to the bottom of the resistor strip, since each of the resistors $R_{SIG0}$–$R_{SIG4}$ are subject to the same field variations when source 16 is at any given position.

It should be noted, however, that the source can only travel to some distance from the end of the encoded resistor strip, since the entire magnetic field must fall on the resistor strip. When the source is at the edge of the encoder strip, the integral of the field would be smaller than prior position measurements and the output of the sensor would not reflect the true position.

Figure 3:
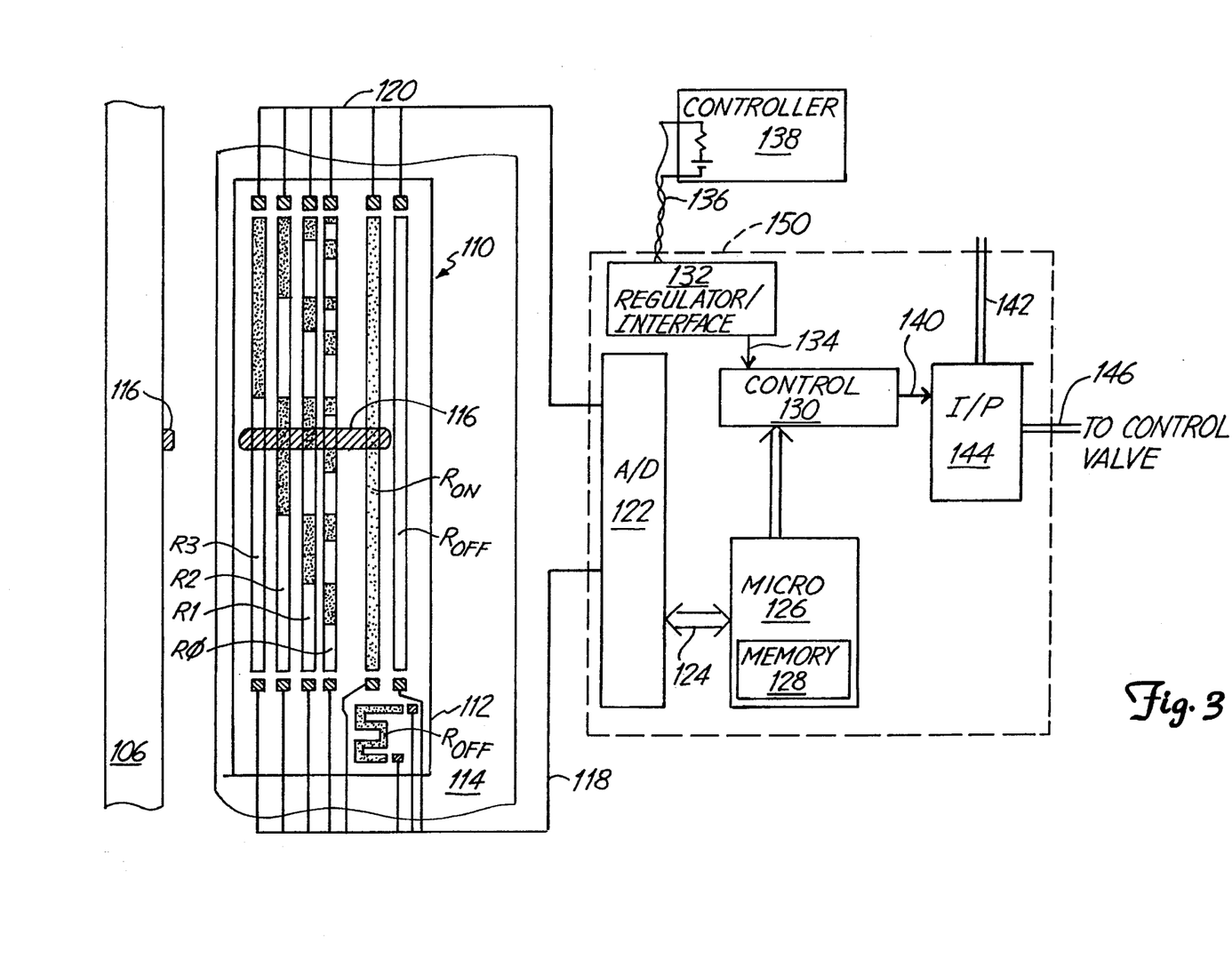
FIG. 3 is a schematic block diagram of a second embodiment of the position sensor of the present invention, as used in a valve positioner; and TABLE 1 is a set of equations for calculating the resistance of the resistors in FIGS. 2 and 3.

In FIG. 3, a second embodiment of a position encoder shown generally at 110 includes a resistor strip 112 affixed to a stationary member 114, such as a pipe. A moving member 106, such as a valve stem or a rotary member, has an LED light source 116 mounted so that it faces resistor strip 112. FIG. 3 shows the relative placement of moving member 106 to stationary member 114, but note that member 106 (and source 116 mounted thereto) are positioned so that source 116 travels over the length of resistor strip 112 in order to provide flux from the source to resistor strip 112. Two terminals from each of seven resistors on strip 112 are connected via a busses 118 and 120 to a valve positioner 150. An interface/regulator 132 is connected over an external two wire circuit 136 to a controller 138, which provides all power for positioner 150. The magnitude of the current in loop circuit 136 is representative of a desired valve position, which interface 132 receives and sends as a signal 134 to a PID control block 130. Both terminals of resistors $R_0$–$R_4$, $R_{ON}$, $R_{OFF}$ and $R_{OUT}$ are connected to an analog-to-digital converter 122, which is constructed similarly to A/D converter 100 in the previous embodiment. As in the previous embodiment, converter 122 provides the potential across each resistance and the current through each resistance to a CMOS microprocessor 126 which includes a 2K program memory 128. As before, microprocessor 126 computes constants A and B, where A represents the addition resistance of any of the resistors $R_0$–$R_3$ in the absence of flux and B represents the additive resistance caused by the flux, if the sensing resistor were entirely made of magnetoresistive material. Microprocessor 126 next computes the absolute position, POS, given by:

$$POS = \sum_{i=0}^{3} \frac{R_i - A}{B} \times 2^i \qquad (4)$$

PID control section 130 receives the computed absolute position, POS, along with the desired valve position signal 134 from regulator/interface 132 and produces a PID control signal 140. Within control circuit 130, the desired position signal 134 and the absolute sensed position signal POS is differenced. Control signal 140 is the linear combination of the time integral of the difference, the time derivative of the difference and a constant term of the difference. Signal 140 regulates a source of pressurized air 142 in a current to pressure (I/P) block 144 to provide a 3–15 psig regulated pneumatic output 146 for use in a control valve or another positioner.

A set of four patterned resistors $R_0$–$R_3$ are located on strip 112, each having a pattern comprising one type of material responsive to the light, such as silicon with an optically thin coating of oxide and another material which is non-responsive, such as an optically opaque thick film printed material like alumina filled epoxy. As the light from flux source 116 impinges on resistors $R_0$–$R_3$, the light generates electron-hole pairs in the exposed silicon, increasing the amount of current flowing through each of the resistors. As discussed regarding the previous embodiment, as long as the pattern is unique as a function of position along the travel of source 116, the processing electronics compute an absolute position of source 116. Also included on strip 112 are reference resistors $R_{ON}$, $R_{OFF}$ and $R_{OUT}$. The shaded area on FIG. 3 corresponds to the responsive material and the unshaded area corresponds to the non-responsive material. However, the set of sense resistors $R_0$–$R_3$ are different from the previous embodiment in that the patterning taken as a whole is compressed logarithmically. The spacing between adjacent patterns of the sense resistors (taken as a whole), is progressively smaller as the source travels in a direction from the bottom to the top of resistor strip 112. Such an arrangement of the patterns provides increased resolution for control valves which have a non-linear operating characteristics, such as quick opening or equal percentage valves. In general, the logarithmically compressed encoder is particularly useful when the valve characteristic requires increased resolution at specific portion of the valve travel. In these valves, much of the valve opening or closing action occurs over a relatively short distance of valve stem (or rotary member) travel. The enhanced resolution of the present logarithmically compressed encoder provides enhanced control of the valve over these critical operating distances, typically near the valve seat where flow control is critical. Other non-linear pattern spacings may be used, especially with valves having operating characteristics especially tailored to the process they control.

A similarly designed position encoder can be made according to the concepts disclosed above, where the source of flux 116 is high energy electrons (beta particles) and the sense resistors are patterned with one type of material which is opaque to beta particles and another material which is transparent to such particles. The resistor substrate 112 is made of an easily processed material such as silicon with an insulating layer of silicon dioxide, the beta opaque material is a one micron layer of easily fabricated and processed metal (such as aluminum) and the beta transparent material is a thin silicon dioxide material less than a micron thick. The mechanism by which the resistance of the sense resistors is modified is an avalanche effect resulting from beta electron impacting a doped silicon lattice. The patterning on the encoder can be either linearly logarithmically spaced, corresponding to encoder 18 and 110, respectively. Another embodiment of the present position encoder is realized with a neutron particle source 116 and sense resistors $R_0$–$R_3$ manufactured of scintillator material, where the patterning on the sense resistors is parallel to the direction of travel. In this embodiment, the scintillator is neutron sensitive plastic and the neutron opaque material is either lead or an appropriate non-neutron sensitive plastic.

Although the present invention has been described with reference to preferred embodiments, workers skilled in the art will recognize that changes may be made in form and detail without departing from the spirit and scope of the invention.

What is claimed is:

1. A position sensor for providing an output representative of a position of a moving member, a source of flux disposed on the moving member, the position sensor comprising:

an array of sense resistors disposed on a stationary member and subject to the flux, each resistor including two types of material, one type responsive and the other type non-responsive to the flux;

a reference circuit for providing a first signal representative of a resistance of the sense resistors in the absence of flux and a second signal representative of a resistance in the sense resistors caused by the flux; and an analyzer for sensing the resistance of each of the sense resistors for forming a corresponding sensed resistance and for providing a referenced additive resistance for each of the sense resistors, the referenced additive resistance determined by differencing each of the sensed resistances and the first signal, ratioing each difference to the second signal, weighting each ratio by a weighting factor and summing the referenced additive resistance for each of the sense resistors to provide the position sensor output.

2. The position encoder of claim 1 where the flux is a magnetic field and the responsive material is magnetoresistive.

3. The position encoder of claim 1 where the flux is light and the responsive material is a semiconductor.

4. The position encoder of claim 1 where the flux is beta radiation and the responsive material is a semiconductor.

5. The position encoder of claim 1 where the flux is neutron radiation and the responsive material is a neutron sensitive plastic.

6. The position sensor of claim 1 where the materials on the sense resistors form a pattern and the pattern, taken as a whole, represents a binary pattern.

7. The position sensor of claim 6 where there is a spacing between each subsequent pattern and the spacing is uniform over the sense resistors.

8. The position sensor of claim 6 where there is a spacing between each subsequent pattern and the spacing is not uniform over the sense resistors.

9. The position sensor of claim 6 where the spacing between subsequent patterns on the sense resistors is logarithmic.

10. The position sensor of claim 1 where the moving member is the rotary member of a valve.

11. The position sensor of claim 1 where the moving member is the stem of a valve.

12. A position transmitter for transmitting a signal representative of a position of a control valve, the control valve having a valve member whose movement determines how far the valve is open, the transmitter comprising:

interface circuitry receiving a current over a two wire loop and providing a desired valve position signal representative of the magnitude of the current;

circuitry and pneumatics for providing a regulated pressure output to the valve as a function of the difference between the desired valve position signal and a sensed absolute position;

a source of flux disposed on the valve stem;

a set of sense resistors disposed on a stationary portion of the valve and subject to the flux, each resistor including two types of material, one type responsive and the other type non-responsive to the flux;

a reference circuit for providing a first signal representative of the resistance of the sense resistors in the absence of flux and a second signal representative of the a resistance in the sense resistors caused by the flux; and circuitry for sensing the resistance of each of the sense resistors for forming a corresponding sensed resistance and for providing a referenced additive resistance for each of the sense resistors, the referenced additive resistance determined by differencing each of the sensed resistances and the first signal, ratioing each difference to the second signal and weighting each ratio by a weighting factor and summing the referenced additive resistance for each of the sense resistors to provide the absolute position of the valve.

13. The positioner of claim 12 where the flux is a magnetic field and the responsive material is magnetoresistive.

14. The positioner of claim 12 where the flux is light and the responsive material is a semiconductor.

15. The positioner of claim 12 where the flux is beta radiation and the responsive material is a semiconductor.

16. The positioner of claim 12 where the flux is neutron radiation and the responsive material is a neutron sensitive plastic.

17. The positioner of claim 12 where the materials on the sense resistors form a pattern and the pattern, taken as a whole, represents a binary pattern.

18. The positioner of claim 17 where there is a spacing between each subsequent pattern and the spacing is uniform over the sense resistors.

19. The positioner of claim 17 where there is a spacing between each subsequent pattern and the spacing is not uniform over the sense resistors.

20. The positioner of claim 17 where the spacing between subsequent patterns on the sense resistors is logarithmic.

21. The positioner of claim 12 where the spacing between subsequent patterns on the sense resistors is non-linear.

22. The positioner of claim 12 where the moving member is the rotary member of a valve.

23. The positioner of claim 12 where the moving member is the stem of a valve.

24. A position transmitter for transmitting a signal representative of a position of a control valve, the control valve having a valve member whose movement determines how far the valve is open, the transmitter comprising:

interface circuitry receiving a current over a two wire loop and providing a desired valve position signal representative of the magnitude of the current;

circuitry and pneumatics for providing a regulated pressure output to the valve as a function of the difference between the desired valve position signal and a sensed absolute position;

a source of flux disposed on the valve stem;

a set of sense resistors disposed on a stationary portion of the valve and subject to the flux, each resistor including two types of material, one type responsive and the other type non-responsive to the flux;

a reference circuit for providing a first signal representative of the resistance of the sense resistors in the absence of flux and a second signal representative of the a resistance in the sense resistors caused by the flux; and circuitry for sensing the resistance of each of the sense resistors for forming a corresponding sensed resistance and for providing a referenced additive resistance for each of the sense resistors, the referenced additive resistance determined by differencing each of the sensed resistances and the first signal, ratioing each difference to the second signal and weighting each ratio by a weighting factor and summing the referenced additive resistance for each of the sense resistors to provide the absolute position of the valve.

25. The transmitter of claim 24 where the flux is a magnetic field and the responsive material is magnetoresistive.

26. The transmitter of claim 24 where the flux is light and the responsive material is a semiconductor.

27. The transmitter of claim 24 where the flux is beta radiation and the responsive material is a semiconductor.

28. The transmitter of claim 24 where the flux is neutron radiation and the responsive material is a neutron sensitive plastic.

29. The transmitter of claim 24 where the materials on the sense resistors form a pattern and the pattern, taken as a whole, represents a binary pattern.

30. The transmitter of claim 29 where there is a spacing between each subsequent pattern and the spacing is uniform over the sense resistors.

31. The transmitter of claim 29 where there is a spacing between each subsequent pattern and the spacing is not uniform over the sense resistors.

32. The transmitter of claim 29 where the spacing between subsequent patterns on the sense resistors is logarithmic.

33. The position sensor of claim 24 where the moving member is the rotary member of a valve.

34. The position sensor of claim 24 where the moving member is the stem of a valve.

35. A position sensor for providing an output representative of a position of a first member relative to a second member, a source of flux disposed on the first member, the position sensor comprising:

an array of sense resistors disposed on the second member and subject to the flux, each resistor including two types of material, one type responsive and the other type non-responsive to the flux;

a reference circuit for providing a first signal representative of a resistance of the sense resistors in the absence of flux and a second signal representative of a resistance in the sense resistors caused by the flux; and an analyzer for sensing the resistance of each of the sense resistors for forming a corresponding sensed resistance and for providing a referenced additive resistance for each of the sense resistors, the referenced additive resistance determined by differencing each of the sensed resistances and the first signal, ratioing each difference to the second signal, weighting each ratio by a weighting factor and summing the referenced additive resistance for each of the sense resistors to provide the position sensor output.

* * * * *

UNITED STATES PATENT AND TRADEMARK OFFICE
CERTIFICATE OF CORRECTION

PATENT NO. : 5,502,380
DATED : March 26, 1996
INVENTOR(S) : Sittler et al.

It is certified that error appears in the above-indentified patent and that said Letters Patent is hereby corrected as shown below:

[54] TITLE, line 4, replace "FWX" with --FLUX--.

Column 1, line 4 replace "FWX" with --FLUX--.

Column 1, line 37, replace "consent" with --constant--.

Column 1, line 41, replace "replace" with --replaced--.

Column 8, line 17, replace "encoder" with --sensor--.

Column 8, line 20, replace "encoder" with --sensor--.

Column 8, line 22, replace "encoder" with --sensor--.

Column 8, line 24, replace "encoder" with --sensor--.

UNITED STATES PATENT AND TRADEMARK OFFICE
CERTIFICATE OF CORRECTION

PATENT NO. : 5,502,380
DATED : March 26, 1996
INVENTOR(S) : Sittler et al.

It is certified that error appears in the above-indentified patent and that said Letters Patent is hereby corrected as shown below:

Column 8, line 63, cancel "the", first occurrence.

Column 9, line 55, cancel "the", first occurrence.

Column 10, line 31, replace "position sensor" with --transmitter--.

Column 10, line 33, replace "position sensor" with --transmitter--.

Signed and Sealed this

Sixth Day of May, 1997

BRUCE LEHMAN

*Attest:*

*Attesting Officer*

Commissioner of Patents and Trademarks